United States Patent
Mansour

(10) Patent No.: US 6,654,364 B1
(45) Date of Patent: Nov. 25, 2003

(54) CELLULAR/PCS CDMA SYSTEM WITH INCREASED SECTOR CAPACITY

(75) Inventor: Nagi A. Mansour, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 09/250,588

(22) Filed: Feb. 16, 1999

(51) Int. Cl.[7] .............. H04B 7/216; H04Q 7/20
(52) U.S. Cl. ............. 370/342; 370/328; 370/335; 455/446; 455/447; 455/561; 455/562.1
(58) Field of Search ................. 370/328, 329, 370/335, 342, 441, 334; 455/446, 447, 450–454, 561, 562, 509

(56) References Cited

U.S. PATENT DOCUMENTS

| | | |
|---|---|---|
| 4,191,860 A | 3/1980 | Weber |
| 5,247,571 A | 9/1993 | Kay et al. |
| 5,303,285 A | 4/1994 | Kerihuel et al. |
| 5,353,331 A | 10/1994 | Emery et al. |
| 5,694,463 A | 12/1997 | Christie et al. |
| 6,122,266 A * | 9/2000 | Lynch .................. 370/335 |
| 6,226,601 B1 * | 5/2001 | Longaker ............ 702/709 |
| 6,360,107 B1 * | 3/2002 | Lin et al. ............. 455/562 |

OTHER PUBLICATIONS

Dennett S., "the cdma2000 ITU–R RTT Candidate Submission (0.18)", 1998 Telecommunication Industry Association, vol. 17, pp. 140–144, Jul. 27, 1998.*

* cited by examiner

Primary Examiner—Duc Nguyen

(57) ABSTRACT

A CDMA cellular/PCS telecommunications cell of increased capacity includes a plurality of sectors controlled by a base station unit using a defined set of CDMA codes for each sector. Cell capacity is increased by using two antennas for each sector corresponding to two subsectors with each using a subset of the CDMA codes defined for the sector and with each subset including a pilot channel.

4 Claims, 1 Drawing Sheet

CELLULAR/PCS CDMA SYSTEM WITH INCREASED SECTOR CAPACITY

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of digital cellular wireless telecommunications. In particular, the present invention is concerned with a cell for CDMA, wireless telecommunications in which capacity is increased by reconfiguring sector operations.

2. Description of the Prior Art

In the field of CDMA cellular/PCS telecommunications, a typical cell includes a base station unit controlling wireless communications using three sector antennas, each covering 120°. The base station unit uses a predefined set of sixty-four CDMA Walsh codes for each sector, with one of the codes used for a pilot channel, another for synchronization, one commonly used for paging, and the remainder available for ordinary traffic calls.

In actual usage, however, all of the remaining channels cannot be used for traffic because of noise accumulated in the band due to a variety of reasons such as interference from adjacent cells and unused multi-path signals. With the distinct advantages of PCS/cellular communications, demand for service is substantial and in some cases, may exceed cell capacity. In the prior art, one of the solutions has been to add more base stations at the same cells to provide increased capacity. This is an expensive solution because it requires additional base stations and equipment.

SUMMARY OF THE INVENTION

The present invention solves the prior art problems discussed above and provides a distinct advance in the state of the art. In particular, the system hereof provides an economical and time-effective way in which to increase the capacity of a cell in a cellular/PCS telecommunications network.

The preferred cell includes a cell site configured into a plurality of sectors having a plurality of antennas coupled with a base station unit for controlling transmission and reception over the antennas using selected ones of a defined set of CDMA codes for each of the sectors. A selected sector includes a plurality of antennas oriented to configure the selected sector into a corresponding plurality of subsectors, and the base station unit controls traffic using a different subset of the defined set of CDMA codes for each subsector.

In the preferred cell, the cell site includes three sectors with each having 64 Walsh codes that are split to service two subsectors. This configures the three-sector cell into a six-sector cell, thereby increasing the capacity of the cell.

BRIEF DESCRIPTION OF THE DRAWINGS

The single drawing figure.

DETAILED DESCRIPTION OF THE PREFERRED EMBODIMENT

Figure 1:
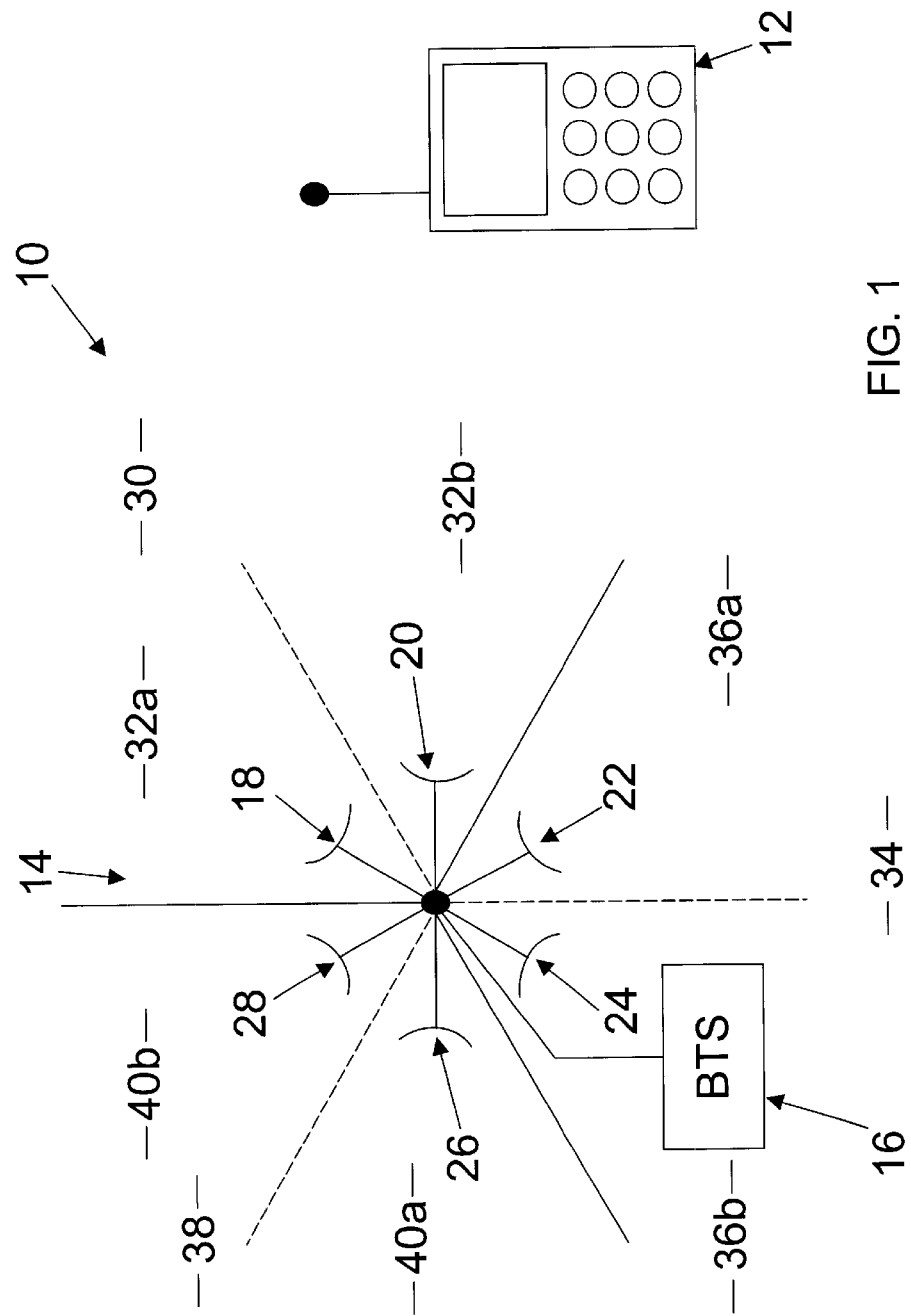
FIG. 1, is a schematic representation of the CDMA cellular/PCS telecommunications cell in accordance with the present invention shown in use with a mobile unit.

The drawing figure illustrates preferred CDMA cellular/PCS telecommunications cell 10 shown in use with mobile unit 12 such as a hand-held PCS telephone but which could also be a pager, computer modem or the like. Cell 10 is preferably part of a CDMA cellular/PCS telecommunications network interfaced with other networks such as a local exchange carrier (LEC) and interexchange carrier (IXC). As those skilled in the art appreciate, a cell typically includes one extra antenna per sector used for diversity. Such extra antennas are not shown in the drawing figure.

Cell 10 includes antenna system 14 and base station unit (BTS) 16. Cell 10 includes a plurality of directional antennas 18, 20, 22, 24, 26 and 28 conventional in nature and operable for transmitting and receiving CDMA cellular/PCS traffic in an arc of about 60°.

Antennas 18–28 are mounted and oriented to configure system 14 into three sectors with each including two subsectors. Specifically, antennas 18 and 20 configure sector 30 into subsectors 32a and 32b. Similarly, antennas 22 and 24 configure sector 34 into subsectors 36a and 36b, and antennas 26 and 28 configure sector 38 into subsectors 40a and 40b. As illustrated, each sector provides coverage of about 1200 with each subsector covering about 60°.

Conventional BTS 16 (such as Model Nortel CDMA Outdoor 1900 MHZ Base Station) is operable to control transmission and reception of CDMA cellular/PCS traffic independently over three sectors using selected ones of a defined set of CDMA codes for each sector. That is, BTS 16 is in the nature of a triplex unit and operates each sector independently using the same set of CDMA codes. In the preferred embodiment, the defined set of CDMA codes includes sixty-four Walsh codes that are split to serve two subsectors. As illustrated in FIG. 1, BTS 16 is coupled with antennas 18–28 for controlling the transmission and reception of CDMA cellular/PCS traffic thereover.

In the operation of sector 30, BTS 16 controls traffic over antenna 18 corresponding to subsector 32a using codes 0–32 as a subset of the 64 total codes with code 0 assigned as the pilot channel and code 32 assigned as the synchronization channel. Similarly, BTS 16 controls traffic over antenna 20 corresponding to subsector 32b using codes 33–64 as a subset using code 33 as the pilot channel and code 64 as the synchronization channel. The assignment of these codes to pilot, synchronization and paging are dependent upon implementation. In a like manner, BTS 16 controls traffic over sector 34 using antennas 22 and 24 for subsectors 36a,b, and controls traffic over sector 38 using antennas 26 and 28 for subsectors 40a,b. Extra antennas (not shown) used for diversity are included at all sectors.

As those skilled in the art will appreciate, the present invention has the effect of doubling the traffic capacity of cell 10. In the prior art, interference problems have limited the capacity of a given sector to less than about 30 codes, even though the BTS can handle 64 codes. With the present invention, each sector is provided with two antennas dividing the sector into two separate subsectors with each assigned a subset of 32 of the 64 available codes. Each subset is assigned pilot, several paging and synchronization channels so that each subsector is independent from the other. The subset of 32 codes assigned to each subsector is still greater than the number of codes that can be effectively used without encountering interference problems. Thus, the capacity of the cell is doubled without adding another BTS.

Those skilled in the art will appreciate that the present invention encompasses many variations in the preferred embodiment described herein. For example, a cell is not limited to three sectors, nor is each sector limited to two subsectors. Having thus described the preferred embodiments of the present invention, the following is claimed as new and desired to be secured by Letters Patent:

What is claimed is:

1. In a CDMA cellular/PCS telecommunications network, a telecommunications cell comprising:

an antenna site configured into a plurality of sectors and including antenna means for transmission and reception of CDMA cellular/PCS telecommunications traffic for said sectors;

a base station unit coupled with said antenna means and including means for controlling transmission and reception over said antenna means using selected ones of a defined set of sixty-four CDMA Walsh codes for each of said sectors;

said antenna means including, for a selected sector, a plurality of antennas oriented to configure said selected sector into two subsectors;

said base station unit including means for controlling telecommunications traffic for said selected sector over said plurality of antennas using two different subsets of said defined set of CDMA codes for said respective subsectors, with each subsector using a different pilot channel and synchronization channel;

a first one of the subsectors using channel 0 as a first pilot channel and channel 32 as a first synchronization channel; and a second one of the subsectors using channel 33 as a second pilot channel and channel 64 as a second synchronization channel.

2. The cell as set forth in claim 1, said antenna site including three of said sectors with each of said sectors including two antennas configuring each of said sectors into two subsectors covering 60 degrees each.

3. In a CDMA cellular/PCS telecommunications network, a telecommunications cell comprising:

an antenna site configured into a plurality of sectors and including antenna means for transmission and reception of CDMA cellular/PCS telecommunications traffic for said sectors;

a base station unit coupled with said antenna means and including means for controlling transmission and reception over said antenna means using selected ones of a defined set of CDMA codes for each of said sectors;

said antenna means including, for a selected sector, a plurality of antennas oriented to configure said selected sector into two subsectors;

said base station unit including means for controlling telecommunications traffic for said selected sector over said plurality of antennas using a two different subsets of said defined set of CDMA codes for said respective subsectors;

a first one of the subsectors using channel 0 as a first pilot channel and channel 32 as a first synchronization channel; and a second one of the subsectors using channel 33 as a second pilot channel and channel 64 as a second synchronization channel.

4. In a CDMA cellular/PCS telecommunications network, a telecommunications cell comprising:

an antenna site configured into a plurality of sectors and including antenna means for transmission and reception of CDMA cellular/PCS telecommunications traffic for said sectors;

a base station unit coupled with said antenna means and including means for controlling transmission and reception over said antenna means using selected ones of a defined set of CDMA codes for each of said sectors;

said antenna means including, for a selected sector, a plurality of antennas oriented to configure said selected sector into two subsectors;

said base station unit including means for controlling telecommunications traffic for said selected sector over said plurality of antennas using a two different subsets of said defined set of CDMA codes for said respective subsectors;

a first one of the subsectors using a first pilot channel, a first synchronization channel, and a first plurality of traffic channels;

a second one of the subsectors using a second pilot channel, a second synchronization channel, and a second plurality of traffic channels; and wherein the first pilot channel is different than the second pilot channel and the first synchronization channel is different than the second synchronization channel.

* * * * *